United States Patent Office 2,724,728
Patented Nov. 22, 1955

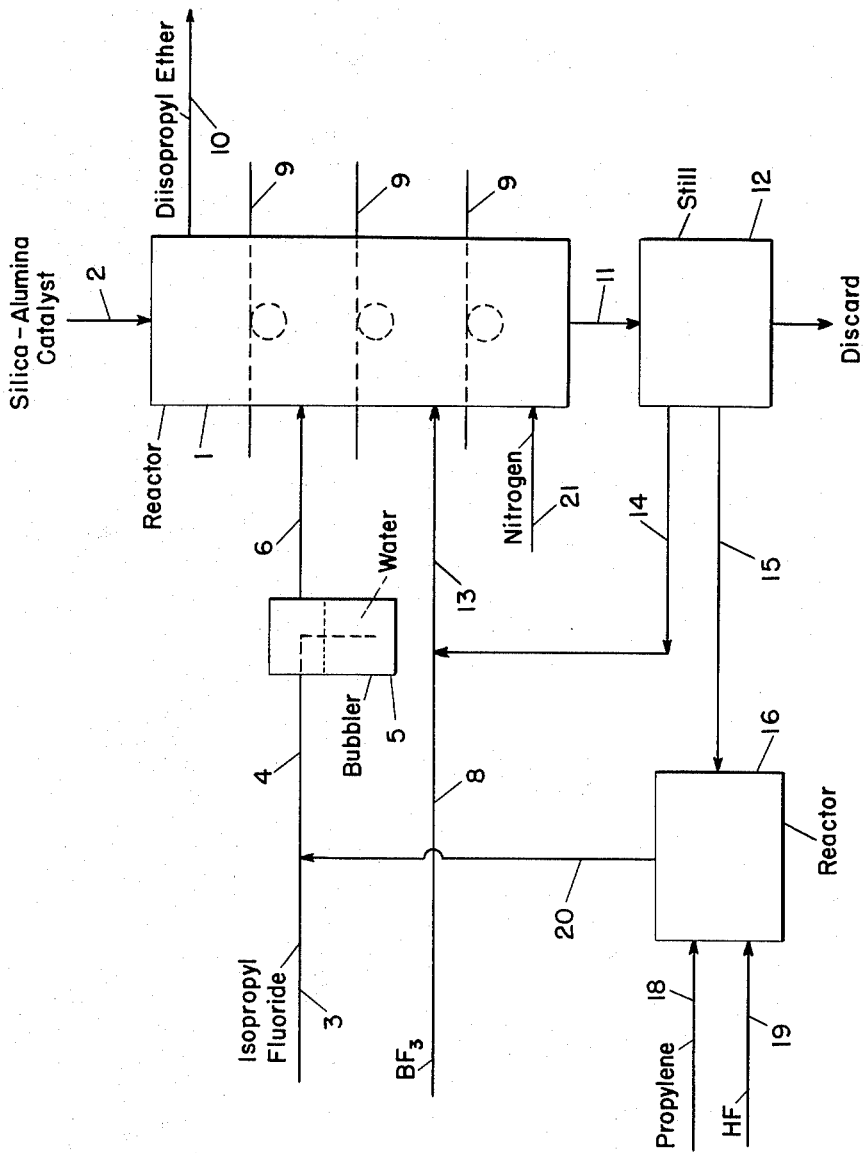

2,724,728
PREPARATION OF ETHERS

Robert M. Kennedy, Newtown Square, Pa., assignor to Sun Oil Company, Philadelphia, Pa., a corporation of New Jersey Application December 19, 1950, Serial No. 201,591

12 Claims. (Cl. 260—614)

This invention relates to a process for the preparation of ethers and relates more particularly to a process for the preparation of ethers from alkyl fluorides using a novel combination of catalytic components.

An object of the present invention is to provide a process for the preparation of ethers. Another object is to provide a process for the preparation of ethers directly from alkyl fluorides. A further object is to provide new compositions of matter effective in the catalytic preparation of ethers and other reactions. Other objects appear hereinafter.

The present process for the preparation of ethers comprises the bringing together of an alkyl fluoride and boron fluoride in the presence of water and a solid composition consisting essentially of silica and alumina. Under the catalytic influence of boron fluoride and silica-alumina, established in this manner, the alkyl fluoride is caused to react with the water to produce an ether having alkyl radicals the same as the alkyl radical of the alkyl fluoride. It is essential to the successful operation of the process that the alkyl fluoride and boron fluoride be contacted only in the presence of both water and the silica-alumina composition, or else the catalytic condition required for the preparation of the ether is immediately spent.

A preferred method of operating the present process is to simultaneously but separately introduce alkyl fluoride and boron fluoride into a reactor containing a silica-alumina composition maintained at a temperature sufficient to continuously distill the ether formed so that the process is continuous. An alternative method of operation is to add $BF_3$ to the silica-alumina composition and then introduce alkyl fluoride to the catalyst containing adsorbed $BF_3$, the temperature being maintained below that at which the ether distills. The temperature is then increased so that the ether is distilled from the reaction zone and the process is repeated. A still further alternative is to first adsorb the alkyl fluoride on a silica-alumina catalyst and then add $BF_3$, the temperature again being maintained below that at which the ether distills. The temperature is then increased so that the ether is distilled from the reaction zone and the process is repeated. The steps of adsorbing both alkyl fluoride and boron fluoride are exothermic, regardless of the order of the adsorption, and hence temperature control means is desirable. In all of the above variations, the water may be introduced as a component of silica-alumina composition, or may be introduced together with the alkyl fluoride or $BF_3$, or both, or it may be separately introduced. Where the water is a component of the silica-alumina, on consumption thereof, it is essential that additional water be added by one of the means above described.

As above stated, the alkyl radicals of the ether correspond to the alkyl radical of the fluoride employed. For example, if isopropyl fluoride is employed, diisopropyl ether is produced, whereas diethyl ether is produced from ethyl fluoride. Any alkyl fluoride may be employed in the present process to produce the corresponding ether, but it is preferred to employ an alkyl fluoride having at least 2 carbon atoms per molecule. As illustrative of the alkyl fluorides which may be employed, preferred alkyl fluorides include ethyl, propyl, isopropyl, n-butyl, isobutyl, tertiary butyl, n-amyl, isoamyl, and the hexyl, heptyl, and the higher alkyl fluorides. Cycloalkyl fluorides, such as cyclohexyl fluoride and alkyl substituted derivatives thereof may also be employed. A further embodiment of the invention comprises the simultaneous use of two different alkyl fluorides, so that a mixture of ether products, including the symmetrical ethers corresponding to the two fluorides, and the mixed ether having one alkyl group identical to the alkyl group of each fluoride, is obtained. The presence of gases inert to the reaction, such as methane, ethane, and nitrogen, do not deleteriously affect the process.

The solid catalytic component employed in the present process consists of silica and alumina. Such compositions have heretofore been used for the cracking of hydrocarbons. It is essential to the present process that both silica and alumina be present, as shown hereinafter. It is preferred to employ a composition containing from 80 to 90% silica and from 10 to 20% alumina, but compositions containing from 10 to 95% silica and from 90 to 5% alumina are operable. Other materials, such as titania, magnesia, zirconia, thoria, iron oxide, and the like, may be present in minor quantities which should not total over 10% of the catalyst. This catalyst may be prepared by methods known to the art, such as by impregnating silica with aluminum salts, by directly combining precipitated hydrated alumina and silica, or by joint precipitation of alumina and silica from aqueous solutions of their salts, and by washing, drying, and heating the so-obtained composition to approximately 1,000° F. Usually this results in a composition containing about 2% water, which is rapidly consumed in the present process, and hence it is desirable in most instances to introduce additional water to the process as above described.

The concentrations of the ingredients of the process may be varied considerably and good results obtained therewith. It is preferred to employ 2 moles of alkyl fluoride per mole of water, although considerable deviation therefrom does not adversely affect the process, a mole ratio of alkyl fluoride to water of from 1:1 to 4:1 giving good results. A catalytic quantity of boron fluoride should be employed, i. e. a quantity sufficient to initiate the reaction should be employed. In general, the quantity of $BF_3$ is advantageously about 10 mole percent of the alkyl fluoride employed, and usually is from 10 to 40 mole percent of the alkyl fluoride. In continuous operation a feed rate of alkyl fluoride, $BF_3$, and water such as to give a total space velocity of from 0.1 to 10 volumes of the components, in the gas phase, per volume of silica-alumina catalyst per hour gives good results, as does an equivalent residence time thereof in batch or semi-continuous operation. Although water is essential to the process, an excessive quantity, above about 10% based on the silica-alumina catalyst, prevents the formation of the ether product. The preferred quantity of water to employ is from 1 to 10% based on the silica-alumina catalyst.

The temperature to employ may be advantageously varied with the method of operation selected. Where continuous operation involving simultaneous introduction of alkyl fluoride and boron fluoride is employed, the temperature is advantageously maintained at about the temperature at which the ether produced distills, so that the ether is continuously removed from the reaction zone. In semi-continuous operation such as where $BF_3$ is first added to the silica-alumina catalyst followed by alkyl fluoride addition, the temperature during both of these steps is preferably maintained relatively low, say from about 0° C. to 50° C., so that a substantial quantity of BF₃ and alkyl fluoride will be adsorbed on the catalyst. The temperature is then increased to drive off the ether produced, and this cycle may be repeated as desired. In this step it is advantageous to pass an inert gas, such as nitrogen or methane through the reaction zone to assist in the removal of the ether; this permits a lower temperature to be used. In the various steps of the process, temperatures of from 0° C. to 300° C. are operable, the optimum temperature depending largely on the alkyl fluoride employed and the method of conducting the process. Pressure does not appear to be a critical variable in the present process. Atmospheric pressure is suitable for all operations although sub- and super-atmospheric pressures may advantageously be employed in some instances. Pressures of from 0.1 to 100 p. s. i. give good results, and are preferred. While it is preferred to introduce the alkyl fluoride in gaseous phase, good results are obtained with its use as a liquid, and the temperature and pressure may be varied, within the stated limits, to give the type of reaction desired.

Under preferred conditions of operations, ether is substantially the only product obtained from the reaction zone by distillation and hence further purification is unnecessary for most purposes. In some instances, however, a small amount of a polymer is obtained with the ether, which, if desired, may be separated therefrom by any convenient means. In the present process, the silica-alumina catalyst is gradually disintegrated, possibly by the action of hydrogen fluoride produced in the reaction or by a complex thereof with one or more components of the system. Accordingly, continuous or intermittent replacement of the silica-alumina catalyst is necessary.

As above described, BF₃ may be first adsorbed by the silica-alumina catalyst. The resulting composition constitutes a new composition of matter which is useful in processes other than the preparation of ethers, such as in the polymerization of olefins. This new composition consists of from 10 to 95% silica and from 90 to 5% alumina having BF₃ adsorbed thereon, the quantity of BF₃ adsorbed being preferably from 5 to 25% by weight of the silica-alumina catalyst. Also, the silica-alumina catalyst containing adsorbed alkyl fluoride constitutes a new composition of matter useful in processes other than that herein claimed, such as for the alkylation of olefins or isoparaffins. This new composition consists of from 10 to 95% silica and from 90 to 5% alumina having an alkyl fluoride adsorbed thereon, the quantity of alkyl fluoride being preferably from 5 to 50% by weight of the silica-alumina catalyst. In both of the above new compositions, minor amounts of other materials, such as magnesia, zirconia, thoria, and the like, may be present, the total of which should not exceed 10% by weight of the silica-alumina catalyst.

Attention is now directed to the accompanying flow diagram, which illustrates a preferred embodiment of the present invention. Silica-alumina catalyst is introduced into reactor 1 through line 2; this introduction may be intermittent or continuous, depending upon the mode of operation desired. Isopropyl fluoride, used to illustrate the various alkyl fluorides which may be employed, is introduced through line 4, bubbler 5, and line 6. The isopropyl fluoride may be from an external source, such as through line 3, or may be prepared, in whole or in part, as a part of the process, as hereinafter described. In bubbler 5 the isopropyl fluoride contacts water and carrys an appropriate quantity thereof through line 6 into reactor 1. The quantity of water introduced may be conveniently regulated by regulating the temperatures of bubbler 5 by any convenient means (not shown). BF₃ is inttroduced into reactor 1 through lines 8 and 13. As above described, it is essential that the isopropyl fluoride and BF₃ be contacted only in the presence of both water and silica-alumina catalyst, and this requirement is met by operating as shown in the flow diagram. In reactor 1 diisopropyl ether is produced and may be continuously distilled therefrom by regulating the temperature in the reactor such as by heat transfer coils 9 to a temperature sufficient to distill the ether. In the present instance, with diisopropyl ether as the product, the temperature is advantageously maintained from 65° C. to 75° C. or higher. Diisopropyl ether, which is recovered through line 10, is substantially the only gaseous product boiling within the range and hence further purification is unnecessary. The silica-alumina catalyst within reactor 1 is gradually disintegrated, probably due to the action of HF evolved in the reaction, and the disintegrated catalyst is removed from reactor 1 through line 11 and passed into still 12; this removal may be intermittently or continuously performed. In still 12 BF₃ is distilled from the sludge and returned to the reaction through lines 14 and 13. A quantity of HF is recoverable from the sludge by distillation and is advantageously employed to prepare additional isopropyl fluoride for the reaction. Accordingly, HF recovered from still 12 is passed through line 15 into reactor 16 wherein it is reacted with propylene supplied through line 18. In the event that the quantity of HF from still 12 is insufficient for the reaction, additional HF may be supplied through line 19 in order to prepare, in whole or in part, the isopropyl fluoride reactant. The isopropyl fluoride so prepared is introduced into the system through lines 20 and 4.

Various modifications in the process shown will be apparent to those skilled in the art. For example, direct introduction of water, as a liquid or vapor, into line 6 or reactor 1 may replace bubbler 5. Also, instead of continuously introducing isopropyl fluoride and BF₃ into reactor 1, they may be alternately introduced at a relatively low temperature, and after admixture thereof in contact with water and the silica-alumina catalyst, the temperature in reactor 1 may be increased to distill the ether and, if desired, an inert gas such as nitrogen may be introduced into reactor 1, such as through line 21, to assist in removing the ether from the reactor. Pumps, valves, gauges, and the like, the location and operation of which will be apparent to those skilled in the art, have been omitted from the flow diagram.

The following examples illustrate the process of the present invention.

*Example 1*

One hundred parts of a silica-alumina catalyst containing about 88% silica, and about 10% alumina, and about 2% water, were introduced into a reaction zone and heated to 100° C. in a stream of nitrogen. After cooling to room temperature, BF₃ was introduced into the reactor until the silica-alumina was saturated therewith, a total of about 15 parts of BF₃ being added. Fifty parts of isopropyl fluoride were introduced, over a period of 5 hours, into the reactor, all of which was adsorbed. The temperature during the addition of BF₃ and alkyl fluoride was maintained below 100° C.

The reactor was then heated to 100° C. while nitrogen was passed therethrough. About 35% of the isopropyl fluoride charged was consumed, and about 20% thereof was recovered as diisopropyl ether.

*Example 2*

Example 1 was substantially repeated except that propylene was used, instead of nitrogen, as the inert gas to assist in the removal of the ether product from the reactor. The yield of diisopropyl ether was about 15 weight percent of the isopropyl fluoride charged.

*Example 3*

Example 1 was substantially repeated except that the silica-alumina catalyst contained about 25% water instead of about 2%. No ether was obtained, the principal product being a polymer of propylene.

*Example 4*

Example 1 was substantially repeated except that an activated alumina containing 5% water was employed in place of the silica-alumina catalyst. No ether was produced, the product being principally propylene.

Repeating this experiment with an activated alumina containing about 25% water, no ether was obtained, the product being principally unreacted isopropyl fluoride.

*Example 5*

Example 1 was substantially repeated except that silica gel was substituted for the silica-alumina catalyst. No ether was obtained as a product.

The above examples are presented in order to assist an understanding of the present invention. When other alkyl fluorides or other conditions within the hereindescribed limits are employed, substantially identical results are obtained therewith.

The ethers prepared in accordance with the present process may be employed for solvents, chemical intermediates, or for any of the applications already known for ethers. A special use for diisopropyl ether is as a high octane component of gasoline for spark-type internal combustion engines.

The invention claimed is:

1. Process of preparing ethers which comprises bringing together an alkyl fluoride and boron fluoride in the presence of water and a silica-alumina catalyst, wherein the quantity of water is not above 10% by weight of the silica-alumina catalyst.

2. Process of preparing ethers which comprises bringing together an alkyl fluoride and boron fluoride in the presence of water and a silica-alumina catalyst, wherein the quantity of water is from 1% to 10% by weight of the silica-alumina catalyst.

3. Process of preparing ethers which comprises reacting an alkyl fluoride with water by bringing together said alkyl fluoride and $BF_3$ in the presence of said water and a silica-alumina catalyst, wherein the mole ratio of alkyl fluoride to water is from 1:1 to 4:1 and the quantity of water is from 1% to 10% by weight of the silica-alumina catalyst.

4. Process according to claim 3 wherein the silica-alumina catalyst contains from 10 to 95% silica and from 5 to 90% alumina.

5. Process according to claim 3 wherein said alkyl fluoride and said $BF_3$ are simultaneously but separately contacted with said silica-alumina catalyst in the presence of water.

6. Process according to claim 3 wherein said alkyl fluoride is contacted, in the presence of water, with said silica-alumina catalyst containing adsorbed thereon said $BF_3$.

7. Process according to claim 3 wherein said $BF_3$ is contacted, in the presence of water, with said silica-alumina catalyst containing adsorbed thereon said alkyl fluoride.

8. Process of preparing diisopropyl ether which comprises reacting isopropyl fluoride with water by bringing together said isopropyl fluoride and $BF_3$ in the presence of said water and a silica-alumina catalyst, wherein the quantity of water is from 1% to 10% by weight of said silica-alumina catalyst, and wherein said silica-alumina catalyst contains from 10% to 95% silica and from 90% to 5% alumina.

9. Process of preparing diethyl ether which comprises reacting ethyl fluoride with water by bringing together said ethyl fluoride and $BF_3$ in the presence of said water and a silica-alumina catalyst, wherein the quantity of water is from 1% to 10% by weight of said silica-alumina catalyst, and wherein said silica-alumina catalyst contains from 10% to 95% silica and from 90% to 5% alumina.

10. Process of preparing diisobutyl ether which comprises reacting isobutyl fluoride with water by bringing together said isobutyl fluoride and $BF_3$ in the presence of said water and a silica-alumina catalyst, wherein the quantity of water is from 1% to 10% by weight of said silica-alumina catalyst, and wherein said silica-alumina catalyst contains from 10% to 95% silica and from 90% to 5% alumina.

11. Process of preparing ditertiary butyl ether which comprises reacting tertiary butyl fluoride with water by bringing together said tertiary butyl fluoride and $BF_3$ in the presence of said water and a silica-alumina catalyst, wherein the quantity of water is from 1% to 10% by weight of silica-alumina catalyst, and wherein said silica-alumina catalyst contains from 10% to 95% silica and from 90% to 5% alumina.

12. Process of preparing diisoamyl ether which comprises reacting isoamyl fluoride with water by bringing together said isoamyl fluoride and $BF_3$ in the presence of said water and a silica-alumina catalyst, wherein the quantity of water is from 1% to 10% by weight of said silica-alumina catalyst, and wherein said silica-alumina catalyst contains from 10% to 95% silica and from 90% to 5% alumina.

References Cited in the file of this patent

UNITED STATES PATENTS

| Number | Name | Date |
|---|---|---|
| 2,135,455 | Loder | Nov. 1, 1938 |
| 2,237,241 | Strosacker et al. | Apr. 1, 1941 |
| 2,428,741 | Plank | Oct. 7, 1947 |
| 2,430,388 | Carnell | Nov. 4, 1947 |
| 2,457,882 | Frey | Jan. 4, 1949 |
| 2,471,130 | Vesterdal | May 24, 1949 |
| 2,484,702 | Frey | Oct. 11, 1949 |
| 2,486,368 | Frey | Oct. 25, 1949 |
| 2,494,510 | Hughes et al. | Jan. 10, 1950 |
| 2,516,403 | McBee et al. | July 25, 1950 |

OTHER REFERENCES

Mellor, Comprehensive Treatise on Inorganic and Theoretical Chemistry, vol. 5, p. 125 (1924), Longmans, Green & Co., London.